United States Patent [19]

Otting et al.

[11] Patent Number: 5,486,843
[45] Date of Patent: Jan. 23, 1996

[54] SIGNAL LEVEL INDICATOR AND ASSOCIATED METHOD

[75] Inventors: Marcia J. Otting, Mundelein; John P. Kramer, Elk Grove Village, both of Ill.

[73] Assignee: Motorola, Inc., Schaumburg, Ill.

[21] Appl. No.: 264,656

[22] Filed: Jun. 23, 1994

[51] Int. Cl.⁶ .............................. G09G 3/04; G09G 3/14; G08C 19/00
[52] U.S. Cl. ..................... 345/35; 345/39; 340/825.77
[58] Field of Search .................... 345/35, 40, 38, 345/25, 27, 94, 39; 340/825.77

[56] References Cited

U.S. PATENT DOCUMENTS

| | | |
|---|---|---|
| 3,487,263 | 12/1969 | Pahlavan .................................. 345/35 |
| 3,976,362 | 8/1976 | Kawakami . | |
| 4,110,665 | 8/1978 | Moore . | |
| 4,203,104 | 5/1980 | Kmetz ...................................... 345/94 |
| 4,336,534 | 6/1982 | Kumagai . | |
| 5,039,978 | 8/1991 | Kronberg ................................. 345/39 |
| 5,093,736 | 3/1992 | Ijima ........................................ 345/94 |

OTHER PUBLICATIONS

Maida; "Dot/Bar–Graph Display Drivers"; *Radio–Electronics*; Oct. 1980; pp. 96–99, 104.

*Primary Examiner*—Alyssa H. Bowler
*Assistant Examiner*—Mark H. Rinehart
*Attorney, Agent, or Firm*—Daniel W. Juffernbruch

[57] ABSTRACT

A signal level indicator (204, 304) displays the magnitude of an input signal (421) by illuminating each of a number of five LEDs (314–318, 414–418) for an individual period of time. The number of LEDs to be illuminated and the individual period of time that each is to be illuminated varies with the magnitude of the input signal (421).

15 Claims, 4 Drawing Sheets

100

—PRIOR ART—

SIGNAL LEVEL INDICATOR AND ASSOCIATED METHOD

BACKGROUND OF THE INVENTION

The present invention relates generally to signal level indicators and, more particularly, to a method and apparatus for improving the efficiency of signal level indicators.

Consumer demands have fueled technological advances in the area of electronics. Through aggressive development and manufacturing, the industry has accomplished increased miniaturization of electronic components resulting in the advent of extremely lightweight and dimensionally constrained hand held portable electronic devices. Such devices are typically battery powered. The operational longevity of the electronic device based on its associated battery life often becomes the fundamental consumer selling point. In order to maximize battery use and, thus, satisfy consumer demands, these electronic devices must be developed to optimize power consumption without depriving user perceptible functionality.

Consumers often evaluate both the operational features and related user perceptible features of electronic devices prior to purchase. For example, an operational feature of a portable cellular telephone considered by a consumer prior to purchase is the amount of continuous "talk time" or "standby time" permitted by the battery associated with the operation of the portable cellular telephone.

Dependent upon operational features are important user perceptible features, such as the need to display operational data to the user by means of a display having visual elements that may be integrated into the electronic device. For example, the portable cellular telephone is generally equipped to provide users with a visually perceptible indication of the communicative effectiveness of a nearby cellular base station. This is generally accomplished via a bar graph-type of arrangement of visual elements that are sequentially illuminated in accordance with the magnitude or strength of control signals received from the nearby cellular base station. This arrangement of visual display elements is referred to as a signal level indicator or a signal strength indicator.

FIG. 1 illustrates a prior art signal level indicator 100 integrated into an light-emitting diode (LED) display 102. The prior art signal level indicator 100 is comprised of five columns with each column having at least one LED element, such as LEDs 104. The prior art signal level indicator 100 visually displays the proportional strength of received signals by sequentially illuminating the columns of LED elements, beginning with the least significant first column 106 and concluding with the most significant fifth column 108. Thus, the reception of a high-strength signal would result in the illumination of all five columns of LED elements, while a low-strength signal would result in only the illumination of the first column 106. FIG. 1 shows the reception of a medium-strength control signal as evident by the sequential illumination of the first three columns of LED elements (for illustrative purposes, illuminated LEDs are shaded).

Previous signal level indicators, such as that shown in FIG. 1 consume an unacceptable amount of power. The reception of stronger control signals results in the illumination of more LEDs and, thus, greater consumption of battery power. Therefore, what is needed is an apparatus and method for displaying signal levels that consumes minimal power without depriving the user of a clear means of visually perceiving the signal level data. By optimizing the user perceptible features of a portable electronic device, a manufacturer is able to increase the effective life of the battery and, thus, permit longer continuous operation of the device. As a result, the manufacturer is able to produce products that are more attractive to the consumer.

DETAILED DESCRIPTION OF THE DRAWINGS

DETAILED DESCRIPTION OF THE PREFERRED EMBODIMENTS

The present invention provides an improved method and apparatus for visually displaying the magnitude of a received signal on a signal level indicator comprised of LEDs. A number of LEDs are enabled and strobed such that each of the number of LEDs is individually illuminated during a display period. The number of LEDs to be illuminated during the display period is based on the magnitude of the received signal. Each of the number of LEDs to be illuminated is individually illuminated for a period of time to fill the display period. At the conclusion of the display period, the LEDs of the signal level indicator are disabled for a rest period. At the conclusion of the rest period, the display period is once again initiated. By strobing the LEDs as previously mentioned during the display period, the magnitude of the received signal can be displayed in a visually perceptible manner that is also efficient with respect to the battery.

Figure 2:
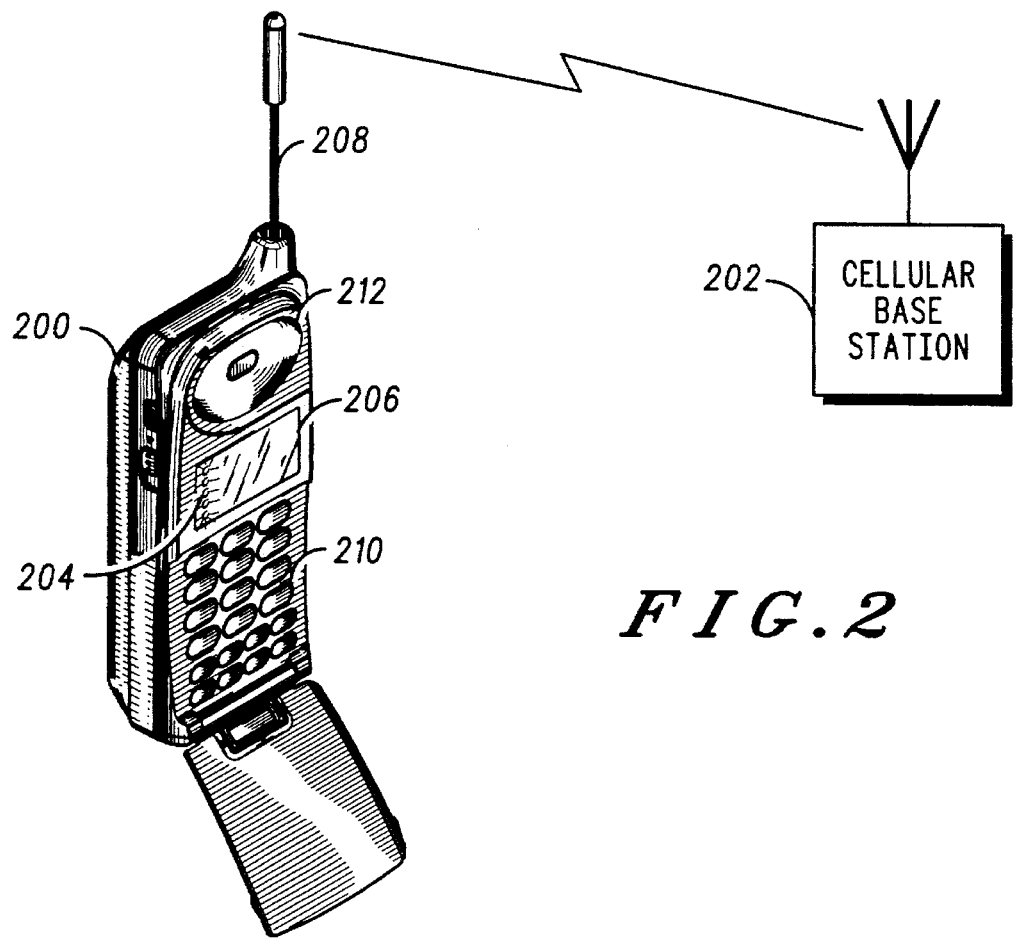
FIG. 2 illustrates a cellular telephone operating in conjunction with a nearby cellular base station and having a signal level indicator in accordance with the present invention.

A portable electronic device that visually displays the magnitude of a received signal is shown in FIG. 2. FIG. 2 illustrates a battery powered portable cellular telephone 200 operating in conjunction with a nearby cellular base station 202 and having a signal level indicator 204 that functions in accordance with the present invention. The cellular telephone 200 includes a display 206, an antenna 208, a keypad. 210, and an earpiece 212. Upon power up, the cellular telephone 200, via the antenna 208, radiates radio frequency signals that registers the cellular telephone 200 with the nearby cellular base station 202. At the completion of the registration and prior to the user's attempt to initiate a call, the cellular telephone 200 monitors radio frequency control channel signals transmitted by the nearby cellular base station 202. The cellular telephone 200 processes the monitored control channel signals and visually outputs to the user the magnitude or strength of these control signals on the signal level indicator 204. Such signal level information determines the communicative effectiveness of, and the likelihood that the user will be able to initiate a call on, the nearby cellular base station 202.

In the preferred embodiment, the signal level indicator 204 is comprised of five LEDs arranged vertically and located on the end portion of the display 206. Although LEDs are utilized, an LCD display, vacuum fluorescent display, other light-emitting devices, such as electric light bulbs, or any other visual element may comprise the signal level indicator. The LEDs of the signal level indicator 204 are arranged vertically with the least significant LED positioned at the bottom location. This arrangement corresponds to a user's natural perception of hierarchy; weaker signals are displayed by the illumination of lower positioned LEDs, while stronger signals are displayed by the illumination of higher positioned LEDs. Note, however, that the number of LEDs and their arrangement may vary to meet applicational needs.

Figure 1:
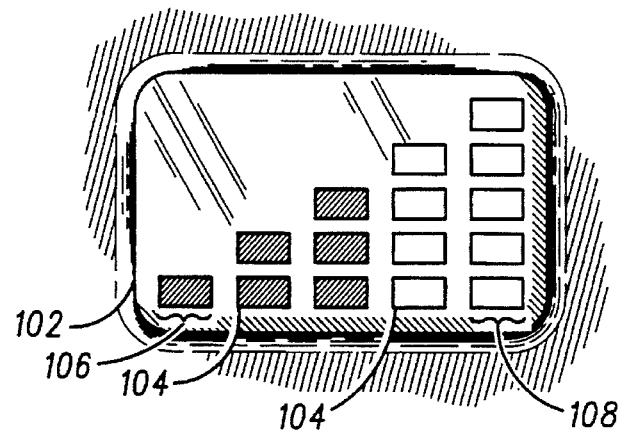
FIG. 1 illustrates a prior art signal level indicator.

In conjunction with the inclusion and arrangement of the signal level indicator 204, the LEDs must be illuminated in an efficient manner that permits the user to perceive and discern the information being displayed. As previously mentioned in reference to FIG. 1, the prior art visually displays the strength of the input signal by continuously illuminating a proportional number of LEDs; thus, a stronger signal is displayed by the continuous illumination of more LEDs. Although the continuous illumination of LEDs relays easily discernible signal strength information to the user, such illumination consumes an unacceptable amount of battery power in portable electronic devices. In order to optimize power consumption without sacrificing the users ability to perceive the received signal strength, this invention strobes a number of the signal level indicator LEDs at a rate based on the strength of the input signal.

Figure 3:
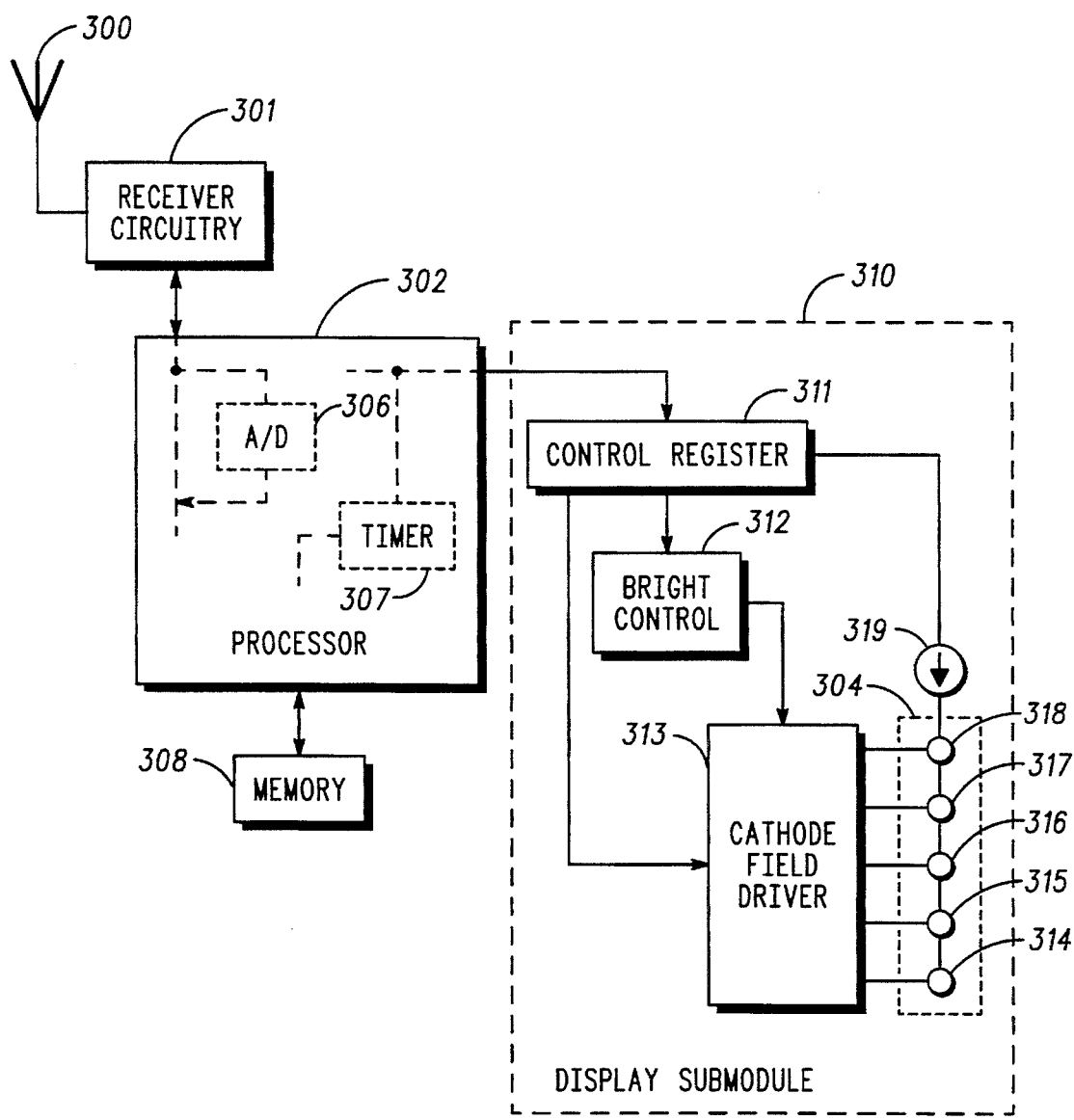
FIG. 3 is a partial block diagram illustrating the receive path and signal level indicator circuitry in accordance with the present invention.

FIG. 3 is a block diagram illustrating the receive path circuitry and signal level indicator according to the present invention. The block diagram includes an antenna 300, receiver circuitry 301, a processor 302 and a memory 308. Coupled to the processor 302 is a control register 311 of a display submodule 310. The control register 311 is further coupled to a brightness control 312 as well as a cathode field driver 313 and an anode current source 319 that further couples a signal strength indicator 304 comprised of a first through a fifth LED 314–318. Note that depending on the complexity of the electronic device additional processors may be utilized.

When receiving a modulated radio frequency signal, such as the aforementioned control signal associated with cellular telephone systems, the antenna 300 receives and converts a radio frequency signal into electrical signals that are further coupled to the receiver circuitry 301. The receiver circuitry 301 generally is operative to filter the received signal, to down-convert in frequency the signal, to demodulate the down-converted signal, to decode such demodulated signal, and to supply the decoded signal to other circuital elements contained in the electronic device.

The processor 302 not only controls the operation of the receiver circuitry 301, but also is a recipient of the decoded signal outputted by the receiver circuitry 301. Once received, an analog signal is routed through an analog-to-digital converter 306 for translation into a proportional discrete digital signal. The analog-to-digital converter 306 samples the analog signal and effectively outputs a numerical, discrete value between 0 and 255 representing the amplitude or magnitude or strength of the received signal. Note that no conversion via the analog-to-digital converter 306 occurs if the decoded signal outputted to the processor 302 by the receiver circuitry 301 is digital.

The processor 302 alters the magnitude of the digitized received signal so as to account for inherent system noise. Electronic devices utilizing a radio frequency receive path often have an associated "noise floor." In the preferred embodiment, a parameter defining the "noise floor" is stored in the memory 308 coupled to the processor 302. Utilizing this parameter, the processor 302 effectively alters the digitizing range (0 to 255) of values from which the magnitude of the digitized received signal is defined. As a result, the realistic lower bound of the digitizing range is raised from 0 to 30 and, thus, a magnitude of a digitized received signal falling within the noise floor is set to 30.

Similarly, the processor 302 alters the magnitude of the digitized receive signal so as to account for maximum system performance. The processor 302 utilizes a similar parameter stored in the memory 308 to define the realistic peak performance of the radio frequency receive path. In the preferred embodiment, the realistic upper bound of the digitizing range is lowered from 255 to 100. Therefore, a magnitude of the digitized received signal exceeding realistic peak performance is set to 100. Thus, the effective, realistic range of digitizing values that can represent the magnitude of a receive signal is between 30 and 100.

The realistic range of digitizing values are further utilized to determine the number of LEDs that must be illuminated to properly indicate the magnitude or strength of the received signal. By utilizing a parameter stored in the memory 308 that denotes the number of LEDs comprising the integrated signal level indicator 304, the processor 302 is able to determine illumination threshold values for the LEDs comprising the signal level indicator 304. The processor 302 accomplishes this by mathematically dividing the realistic range of digitizing values by the number of LEDs comprising the signal strength indicator. In the preferred embodiment, the realistic range of digitizing values is 70 (peak value of 100 "minus" noise floor of 30) and the signal level indicator 304 is comprised of 5 LED elements 314–318; thus, the incremental illumination steps are 14 (70 "divided by" 5) and the threshold illumination values for the five LED elements 314–318 are respectively 30, 44, 58, 72, and 86. Therefore, for example, if the magnitude of the digitized received signal is 50, then the first two LEDs 314 and 315 will be illuminated; likewise, if the magnitude is 75, then the first four LEDs 314–317 will be illuminated.

Once the number of LEDs to be illuminated is determined, the processor 302 determines an illumination time for each of the number of LEDs to be illuminated. The illumination of LEDs is enabled and, thus, occurs during a display period. In the preferred embodiment, the duration of the display period is set at approximately 0.5 seconds by a value stored in the memory 308. The processor 302 then determines the illumination time by dividing the display period equally among the number of LEDs to be illuminated in accordance with the magnitude of the digitized received signal. By further applying the aforementioned examples, if the first two LEDs 314 and 315 are to be illuminated, then each of the first two LEDs 314 and 315 are to be individually illuminated for 0.25 seconds (0.5 seconds "divided by" 2); and if the first four LEDs 314–317 are to be illuminated, then each of the first four LEDs 314–317 are to be individually illuminated for 0.125 seconds (0.5 seconds "divided by" 4). Thus, the individual illumination time varies inversely in proportion to the magnitude of the received signal.

The processor 302 utilizes a timer 307 to assist in the control of the individual illumination time of the number of LEDs to be illuminated. The timer 307 coordinates the transmission of data from the processor 302 to the control register 31.1 which, in turn, controls the individual illumination of the LEDs 314–318 comprising the signal level indicator 304. For example, if the first two LEDs 314 and 315 are to be individually illuminated for 0.25 seconds, at the beginning of the 0.5 second display period, the control register 311 receives data from the processor 302 to individually illuminate the first LED 314. At this time the timer 307 is reset and initiated. After 0.25 seconds have elapsed on the timer 307, the processor 302 directs the control register 311 to turn off the first LED 31.4 and illuminate the second LED 315. After 0.5 seconds have elapsed on the timer 307, the processor 302 directs the control register 311 to turn off the second LED 315 and, thus, battery power consumption by the indicator is reduced while user perceptibility of the indicator is improved.

The control register 311 of the display submodule 310 responds to data control signals from the processor 302 by illuminating the requested LEDs. Coupled between the control register 311 and the signal level indicator 304 is the anode current source 319 which provides current to the LEDs 314–318 of the signal level indicator 304. Also coupled between the control register 311 and the signal level indicator 304 by a multiplexed 5 to 1 bus is the cathode field driver 313. The cathode field driver 313 is individually coupled to LEDs 314–318. The control register 311 illuminates individual LEDs by actuating the appropriate output of the cathode field driver 313 which biases the corresponding LED. The current supplied by the anode current source 319 is then permitted to flow through and cause the LED to become illuminated. The brightness control 312 coupled between the control register 311 and the cathode field driver 313 may additionally regulate the current flow through the biased LEDs. Dynamic brightness control may be used in applications where illuminated LEDs of the signal level indicator 304 must be perceived through a substantially opaque lens cover.

Figure 4:
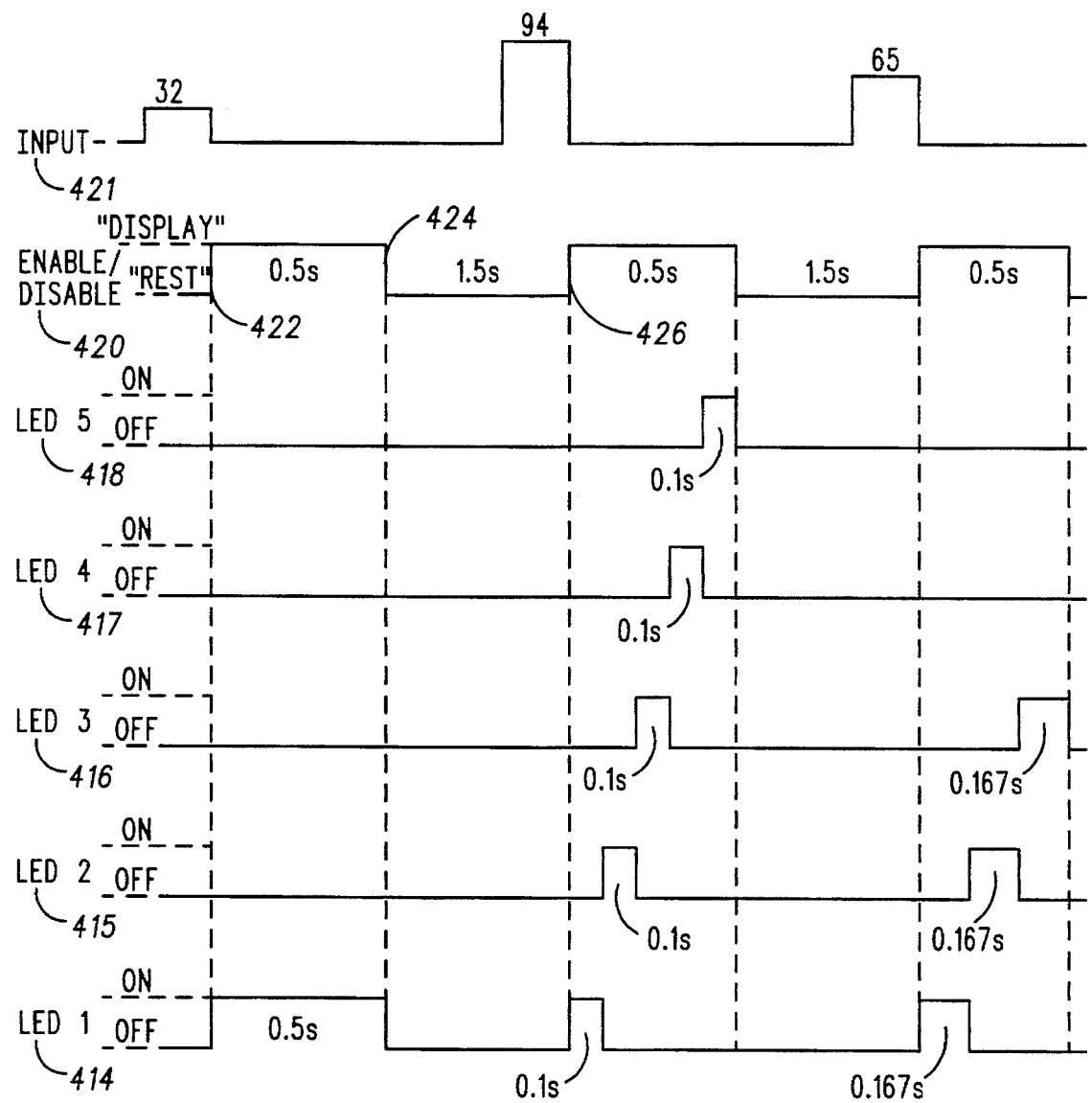
FIG. 4 is a timing diagram illustrating indication of the signal level of an input signal in accordance with the present invention.

FIG. 4 illustrates a timing diagram disclosing an example scenario of indicating the magnitude of an input signal. The timing diagram shows the correspondence between an input 421 and resulting illumination activity on five LEDs 414–418 of the signal level indicator in conjunction with an enable/disable cycle 420. The enable/disable cycle 420 refers to the approximately 0.5 second display period (indicated by the high position of the diagram line) during which LEDs are enabled to be illuminated and an approximately 1.5 second rest period (indicated by the low position) during which LEDs are disabled and are not to be illuminated. The illumination of one of the five LEDs 414–418 is indicated by the high position of the diagram line, while the low position indicates non-illumination. The example scenarios resulting from the input 421 of received signals having magnitudes of 32, 94, and 65 are documented in FIG. 4 and discussed in the following.

The input 421 of a received signal having the magnitude of 32, a weak signal, results in the illumination of the first LED 414 for the entire display period of 0.5 seconds. Upon reception and during a rest period, the magnitude of the received signal is allotted up to five LEDs for subsequent display on the signal level indicator. The LEDs are specifically allotted via the comparison of the magnitude to determined illumination threshold values (see discussion of FIG. 3). The received signal having the magnitude of 32 is allotted one LED. The individual illumination time of the single allotted LED is then calculated to be 0.5 seconds. Note that in the case of a single LED, the LED is to be illuminated for the entire display period. At the initiation of the display period 422, the first LED 414 is illuminated. At the conclusion of the display period 424, the first LED 414 is turned off.

The input 421 of a received signal having the magnitude of 94, a strong signal, results in the illumination of all five LEDs 414–418 during the 0.5 second display period. During a subsequent rest period, the received signal was resampled and was determined to have a magnitude of 94 suggesting allotment of all five LEDs. The individual illumination time of each of the five allotted LEDs is then calculated to be 0.1 seconds. At the initiation of a subsequent display period 426, the first LED 414 is illuminated for 0.1 seconds. At the conclusion of 0.1 seconds, the first LED 414 is turned off and the second LED 415 is illuminated for 0.1 seconds. After 0.2 seconds of the display period has elapsed and the second LED 415 has been illuminated for 0.1 seconds, the second LED 415 is turned off and the third LED 416 is illuminated. After 0.3 seconds of the display period has elapsed and the third LED 416 has been illuminated for 0.1 seconds, the third LED 416 is turned off and the fourth LED 417 is illuminated. After 0.4 seconds of the display period has elapsed and the fourth LED 417 has been illuminated for 0.1 seconds, the fourth LED 417 is turned off and the fifth LED 418 is illuminated. At the conclusion of the 0.5 second display period, the fifth LED 418, which has been illuminated for 0.1 seconds, is turned off.

The input 421 of a received signal having the magnitude of 65, a medium-strength signal, results in illumination of three LEDs 414–416 during the 0.5 second display period. The individual illumination time of each of the three LEDs 414–416 is calculated to be approximately 0.167 seconds. Therefore, each of the three LEDs 414–416, beginning with the first LED 414, will be individually illuminated for approximately 0.167 seconds during the 0.5 second display period.

As previously mentioned, the continuous display of signal level information via the illumination of multiple LEDs consumes an unacceptable amount of power. The above example scenario for displaying signal level information suggests a power saving method without sacrificing visual discernment. Power savings is accomplished by illuminating multiple LEDs for short intervals. By strobing the signal level indicator in the aforementioned manner, signal level information can be displayed by multiple illuminated LED elements for the amount of power consumed by a single LED continuously illuminated for 0.5 seconds in previous signal level indicators.

Visual discernment and perception by the user is maintained by interposing signal level display periods with lengthier rest periods. This prevents signal information from separate sampling incidents from "running together." Although the duration of the display period and the rest period are 0.5 seconds and 1.5 seconds, respectively, these times could be replaced by other times which would also render the signal level indicator visually discernible. Additionally, because the individual illumination time varies inversely with the magnitude of the received signal, the user will readily be able to differentiate the displayed magnitude of the received signal not only by the number of illuminated LEDs, but also by the rate at which the LEDs are sequentially illuminated.

Figure 5:
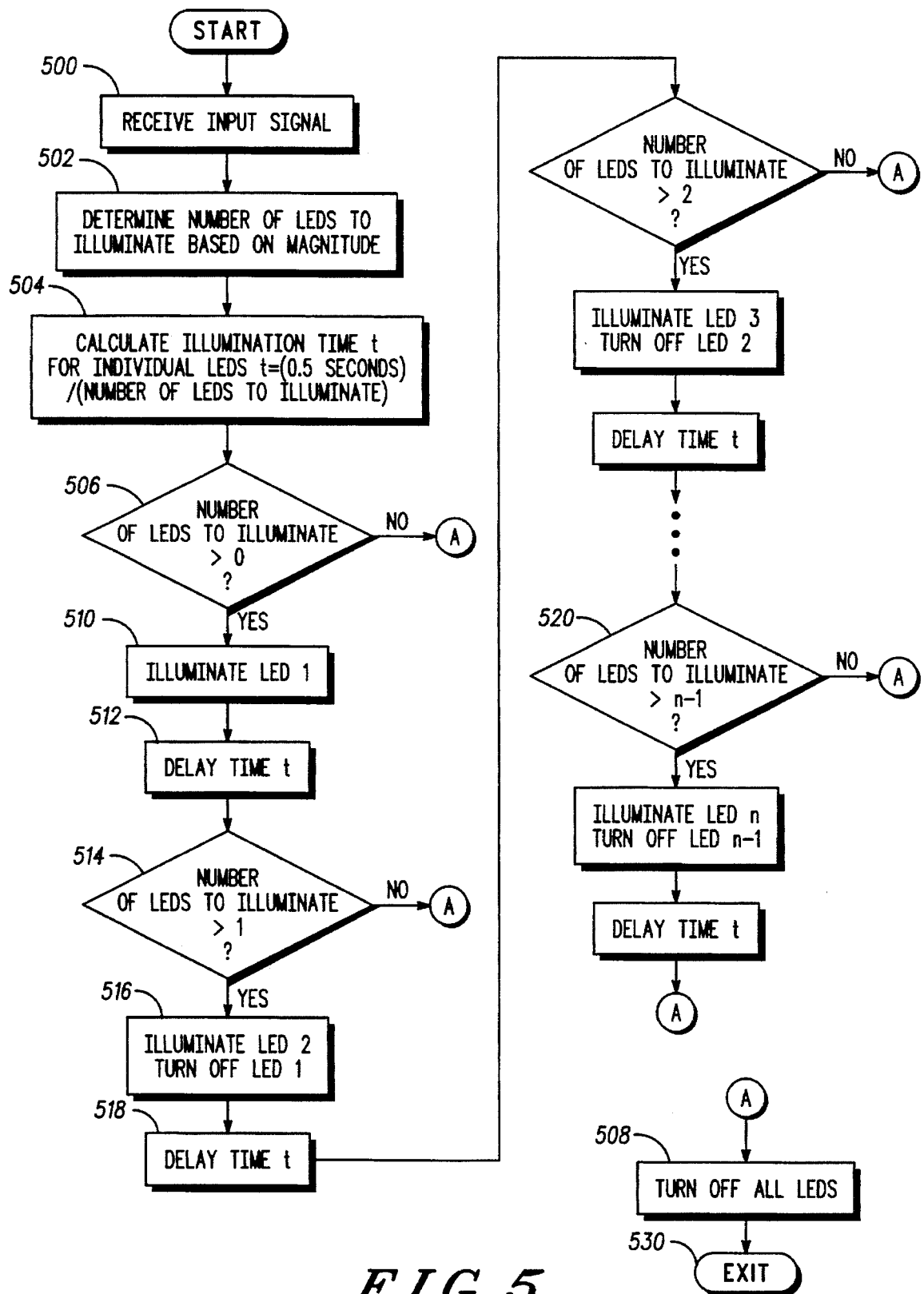
FIG. 5 is a flow chart further illustrating a method of indicating the signal level of an input signal in accordance with the present invention.

FIG. 5 is a flow chart illustrating a method of indicating the magnitude of an input signal on a signal level indicator. The process is initiated by the reception of an input signal (at 500) into the processor 302. The magnitude of the input signal is digitized and the processor 302 subsequently determines, from the digitized magnitude, the number of LEDs to illuminate (at 502) so as to proportionally display the magnitude of the input signal on the signal level indicator 204, 304. The processor 302 then calculates the individual illumination of each of the LEDs to be illuminated (at 504) by dividing the length of the display period, 0.5 seconds, by the number of LEDs to be illuminated. If no LEDs are to be illuminated (at 506), which at this stage generally only occurs in the event that the electronic device experiences a system failure, then all LEDs are disabled (at 508) and the process exited (at 530). The preceding steps are generally performed during the signal level indicator rest period. During the rest period, the LEDs of the signal level indicator are disabled and are not illuminated.

The display period during which the LEDs of the signal level indicator are illuminated is initiated with the illumination of the first LED 314, 414 (at 510). The first LED 314, 414 is illuminated for the previously calculated (at 504) individual illumination time (at 512). If the second LED 315, 415 is to be illuminated (at 514), then the second LED 314, 415 is illuminated and the first LED 314, 315 is turned off (at 516). However, if the first LED 314, 414 is the only LED to be illuminated, then all LEDs are turned off (at 508) and the display period is exited (at 530). The second LED 315, 415 is illuminated for the previously calculated (at 504) individual illumination time (at 518). The sequential illumination and "turning off" as proscribed in the aforementioned manner is continued until all of the LEDs that were determined to be illuminated (at 502) have individually been illuminated for the calculated period of time (at 504). The number of iterative steps associated with the method and present in FIG. 5 does not exceed the physical number of LEDs present in the signal level indicator 204, 304, indicated by the variable "n" (at 520).

In summary, the present invention provides a signal level indicator for a portable electronic device that is both efficient and visually perceptible. The magnitude of an input signal is visually outputted to the user on a series of hierarchically arranged visual elements, such as LEDs, that comprise the signal level indicator. Upon reception of an input signal, a number of the available LEDs are allotted in accordance with the magnitude of the input signal. In addition, an individual illumination time for each of the allotted LEDs is also determined. During a subsequent display period, each of the allotted LEDs are individually illuminated for that time. Thus, the number of LEDs illuminated and the time that each LED is individually illuminated varies with the magnitude of the input signal. Power savings is accomplished by illuminating the signal level indicator in the above manner. Signal level information can be displayed by multiple illuminated LED elements for the same amount of power consumed by a single LED continuously illuminated for 0.5 seconds in previous signal level indicators. Also, visual discernment and perception by the user is maintained by interposing signal level indicator display periods with lengthier rest periods.

In addition to visually displaying the magnitude of a received radio frequency signal as discussed in the aforementioned, the signal level indicator and associated method of this invention could also be used as other level indicators such as a battery level indicator. Although the invention has been described and illustrated in the above description and drawings, it is understood that this description is by example only and that numerous changes and modifications can be made by those skilled in the art without departing from the true spirit and scope of the invention.

We claim:

1. A portable electronic device having a signal level indicator for visually indicating the magnitude of at least one input signal, comprising:

a plurality of visual elements; and a processor circuit operatively coupled to said plurality of visual elements for perceivably strobing said plurality of visual elements in response to the at least one input signal, said processor circuit determining a number of said plurality of visual elements to be individually illuminated during a display period said number of said plurality of visual elements based on the magnitude of the at least one input signal, and said processor circuit individually illuminating each one of said number of said plurality of visual elements for an individual illumination period during said display period such that no more than one of said number of said plurality of visual elements is illuminated at any one time.

2. A portable electronic device having a signal level indicator according to claim 1, wherein said individual illumination period relates to the magnitude of the at least one input signal.

3. A portable electronic device having a signal level indicator according to claim 2, wherein said individual illumination period varies inversely with the magnitude of the at least one input signal such that increases in the magnitude of the at least one input signal decreases said individual illumination period and such that decreases in the magnitude of the at least one input signal increases said individual illumination period.

4. A portable electronic device having a signal level indicator according to claim 1, wherein said processor circuit enables said number of said plurality of visual elements for said display period and said processor circuit disables said plurality of visual elements for a rest period.

5. A portable electronic device having a signal level indicator according to claim 4, wherein said rest period is perceivably greater than said display period.

6. A portable electronic device having a signal level indicator according to claim 1, wherein said plurality of visual elements are light-emitting diodes.

7. A portable electronic device having a signal level indicator according to claim 1, wherein the portable electronic device comprises a portable radio telephone.

8. A method of visually indicating the magnitude of an input signal on a plurality of visual elements operatively coupled to a processor circuit, said method comprising the steps of:

(a) receiving an input signal at an at least one input of the processor circuit; and (b) perceivably strobing the plurality of visual elements, wherein said step (b) of perceivably strobing consists of:

(i) determining a number of the plurality of visual elements to be individually illuminated during a display period based on the magnitude of the input signal;

(ii) determining an individual illumination time for each of the number of the plurality of visual elements, the individual illumination time varying inversely with the magnitude of the input signal; and (iii) individually illuminating each one of the number of the plurality of visual elements for the individual illumination period such that no more than one of the number of the plurality of visual elements is illuminated at any one time.

9. A method according to claim 8, said step (b), after substep (i) but before substep (iii), comprises the substep of:

(i1) enabling the number of the plurality of visual elements to be individually illuminated.

10. A method according to claim 8, further comprising the step of: (c) disabling the plurality of visual elements during a rest period.

11. A portable cellular telephone comprising:

an antenna for receiving a radio frequency signal;

a receiver circuit operatively coupled to said antenna;

a processor circuit operatively coupled to said receiver circuit; and a display having a plurality of light-emitting diodes operatively coupled to said processor circuitry, wherein said processor circuit perceivably strobes said plurality of light-emitting diodes in response to the radio frequency signal, said processor circuit determines a number of said plurality of light-emitting diodes to be individually illuminated during a display period, said number of said plurality of light-emitting diodes based on the magnitude of the radio frequency signal, said processor circuit individually illuminates each one of said number of said plurality of light-emitting diodes for an individual illumination period during said display period such that no more than one of said number of said plurality of visual elements is illuminated at any one time, said individual illumination period is inversely proportional to the magnitude of the radio frequency signal, and said processor circuit enables said number of said plurality of light-emitting diode for said display period and said processor circuit disables said plurality of light-emitting diodes for a rest period, said rest period is perceivably greater than said display period.

12. The portable electronic device according to claim 1 wherein the at least one input signal is a radio frequency (RF) signal.

13. The portable electronic device having a signal level indicator according to claim 1 wherein said processor circuit determines said individual illumination period by dividing said display period by said number of said plurality of visual elements.

14. A portable electronic device having a signal level indicator for visually indicating the magnitude of at least one input signal, comprising:

a plurality of visual elements; and a processor circuit operatively coupled to said plurality of visual elements for perceivably strobing said plurality of visual elements in response to the at least one input signal, said processor circuit determining a number of said plurality of visual elements to be individually illuminated during a display period, said number of said plurality of visual elements directly proportional to the magnitude of the at least one input signal, and said processor circuit illuminating each one of said number of said plurality of visual elements for a perceivable individual illumination period, said individual illumination period being inversely proportional to the magnitude of the at least one input signal such that said individual illumination period is shorter when the magnitude of the at least one input signal is larger and such that said individual illumination period is longer when the magnitude of the at least one input signal is smaller.

15. The portable electronic device having a signal level indicator according to claim 14 wherein said processor circuit determines said individual illumination period by dividing said display period by said number of said plurality of visual elements.

* * * * *